United States Patent [19]

Toliusis

[11] Patent Number: 4,524,807
[45] Date of Patent: Jun. 25, 1985

[54] SNAP-TOGETHER MODULAR MANIFOLD CONSTRUCTION

[75] Inventor: Vytautas J. Toliusis, Paw Paw Township, Van Buren County, Mich.

[73] Assignee: Humphrey Products Company, Kalamazoo, Mich.

[21] Appl. No.: 380,846

[22] Filed: May 21, 1982

[51] Int. Cl.³ .................................... F16L 39/00
[52] U.S. Cl. .................................... 137/884; 137/269; 137/327; 137/561 R; 137/596.17; 285/404; 285/DIG. 22
[58] Field of Search ............ 137/269, 270, 327, 561 R, 137/561 A, 596.17, 798, 884; 285/305, 371, 404, DIG. 22

[56] References Cited

U.S. PATENT DOCUMENTS

| | | | |
|---|---|---|---|
| 2,958,547 | 11/1960 | Batts et al. | 285/325 X |
| 3,158,164 | 11/1964 | Barton | 137/884 X |
| 3,506,029 | 4/1970 | Demler et al. | 137/561 R |
| 3,556,147 | 1/1971 | Sizer et al. | 137/884 |
| 3,756,274 | 9/1973 | Wolfgramm | 137/884 X |
| 3,806,088 | 4/1974 | Stoneman et al. | 137/884 X |
| 3,915,194 | 10/1975 | Friedrich | 137/884 |
| 3,930,674 | 1/1976 | Jonsson | 285/371 X |
| 4,027,692 | 6/1977 | Bouteille et al. | 137/270 |
| 4,070,045 | 1/1978 | Colter et al. | 285/325 |
| 4,230,143 | 10/1980 | Dettmann et al. | 137/270 |
| 4,247,133 | 1/1981 | Möller | 285/4 |
| 4,289,339 | 9/1981 | Hansen | 285/404 X |
| 4,359,064 | 11/1982 | Kimble | 137/884 X |

FOREIGN PATENT DOCUMENTS 2654930  6/1977  Fed. Rep. of Germany ...... 137/884

OTHER PUBLICATIONS

ASCO Bulletin 8340.
Humphrey Products Catalog 80, p. 24.

*Primary Examiner*—A. Michael Chambers
*Assistant Examiner*—John C. Fox
*Attorney, Agent, or Firm*—Flynn, Thiel, Boutell & Tanis

[57] ABSTRACT

A fluid manifold includes at least two releasably interconnected modules, a valve assembly being mountable on each module. A fluid supply channel in each module is in fluid communication with the valve assembly thereon and with fluid supply channels in adjacent modules. A seal assembly provided between adjacent modules prevents leakage of fluid from the supply channels. Each module has two recesses at one end and two outwardly projecting and integral arms at the other end which are received in the recesses on an adjacent module. The arms and recesses have cooperating detents which retain the modules in the interconnected relationship, and screws extend into grooves provided on the arms to maintain the modules locked together.

12 Claims, 10 Drawing Figures

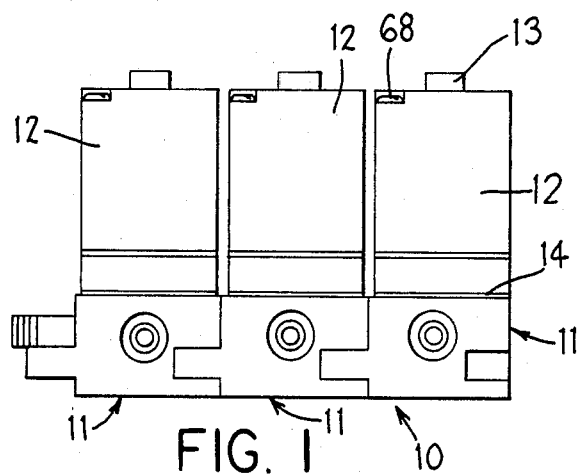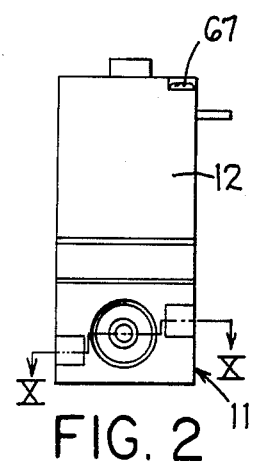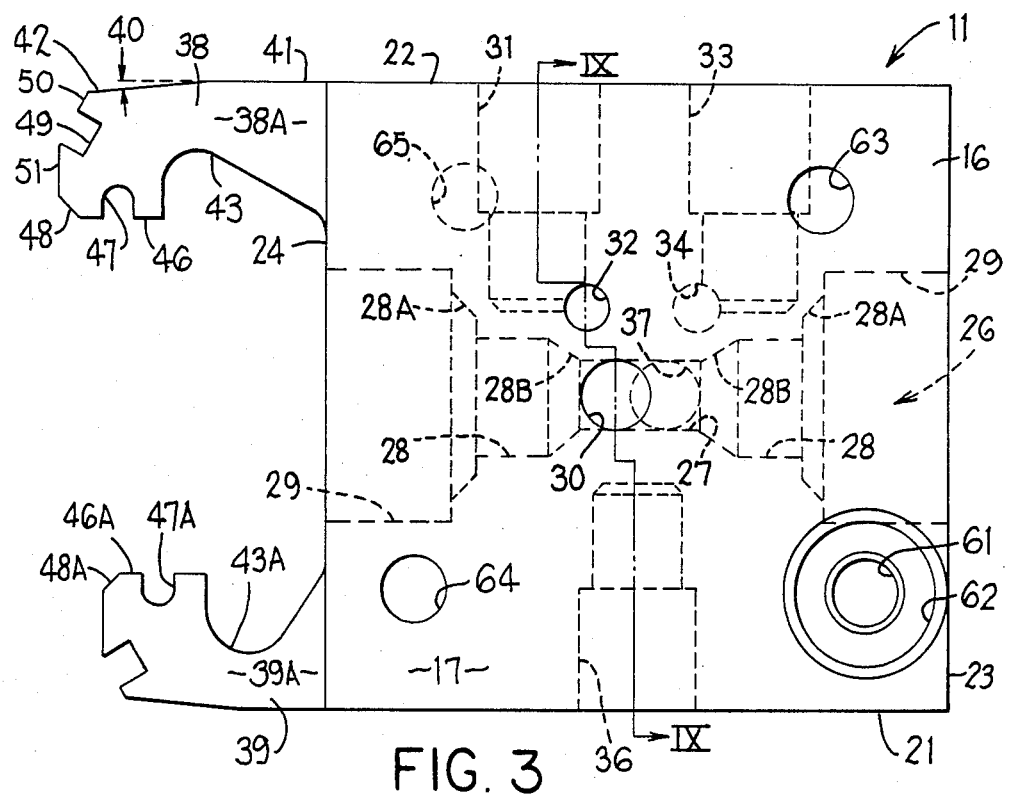

SNAP-TOGETHER MODULAR MANIFOLD CONSTRUCTION

FIELD OF THE INVENTION

This invention relates to a fluid supply manifold and, more particularly, to a fluid supply manifold which includes at least two releasably interconnected modules.

BACKGROUND OF THE INVENTION

Fluid control systems typically include a manifold having a plurality of valve assemblies, such as three-way or four-way valve assemblies, mounted thereon for controlling the flow of a pressure fluid such as air from a common pressure source to a plurality of respective load devices. An important advantage of employing a manifold is that it greatly simplifies the complexity of the piping arrangement.

In an attempt to provide flexibility to the design of fluid control systems, manifolds have been developed in the form of separable sections, a plurality of such sections being interconnected in order to provide a manifold on which the desired number of valve assemblies can be mounted. Although manifolds of this type have generally been adequate for their intended purposes, they have not proved satisfactory in all respects.

More specifically, a number of extra parts are typically required to effect interconnection of the sections, for example long bolts which extend through all of the sections and have nuts at the ends thereof to securely clamp the sections together. Moreover, the manifold sections typically are made of metal and are manufactured by performing a number of machining operations on a metal blank, thereby rendering them relatively expensive.

Accordingly, it is an object of the present invention to provide a manifold for a plurality of valve assemblies which includes a plurality of modules which are releasably interconnected, the connection or disconnection of the modules being effected rapidly and with a minimum number of parts and tools.

A further object of the invention is to provide a manifold, as aforesaid, the modules of which can be manufactured with a minimum number of machining operations and therefore are relatively easy and inexpensive to manufacture, which modules are preferably of a plastics material and are formed substantially by a single injection molding operation.

A still further object of this invention is to provide a manifold, as aforesaid, the modules of which have structure integral therewith for permitting adjacent modules to be easily resiliently snapped together, and which permits adjacent connected modules to be locked together by using the screws which attach the valves to the manifold.

Another object of the invention is to provide a manifold, as aforesaid, in which a dependable fluid seal is effected between communicating fluid passageways in adjacent modules.

A further object of the invention is to provide a manifold, as aforesaid, which is very durable and is substantially maintenance free.

SUMMARY OF THE INVENTION

A fluid manifold includes at least two modules each having first, second and third surfaces thereon, the first and second surfaces being on opposite ends thereof. A fluid supply channel extends through each module and terminates in first and second fluid supply ports respectively provided in the first and second surfaces. A first fluid supply opening is provided in the third surface and communicates with the supply channel between the first and second ports. A mechanism integral with the modules is provided for releasably interconnecting the modules in an end-to-end relationship in which the first and second surfaces on respective and adjacent modules are adjacent and the first and second supply ports therein are substantially aligned. A seal arrangement cooperable with adjacent modules is provided for preventing leakage of fluid from the fluid supply channels.

In a preferred embodiment, the interconnection mechanism includes first and second spaced and resiliently flexible arms provided on each module. The arms project outwardly beyond the first end surface of the module on opposite sides of the first supply port substantially parallel to the supply channel therein. Recesses are provided in each module at the end thereof opposite the flexible arms. The flexible arms on a given module are received within the recesses in an adjacent module when the modules are releasably interconnected. Cooperating detents are provided on the arms and in the recesses for creating a resilient snap-type connection between the modules. The arms preferably have different lengths and heights and each recess has a length and height substantially the same as the corresponding arm, thereby ensuring that the releasable interconnection of the modules can be effected only when the modules have a predetermined orientation with respect to each other.

BRIEF DESCRIPTION OF THE DRAWINGS

FIG. 1 is a side view of a pneumatic control system which includes a manifold embodying the present invention and a plurality of valve assemblies mounted thereon.

FIG. 2 is an end view of the control system of FIG. 1.

FIG. 3 is a top view of a module which is a component of the manifold illustrated in FIG. 1.

Figure 4:
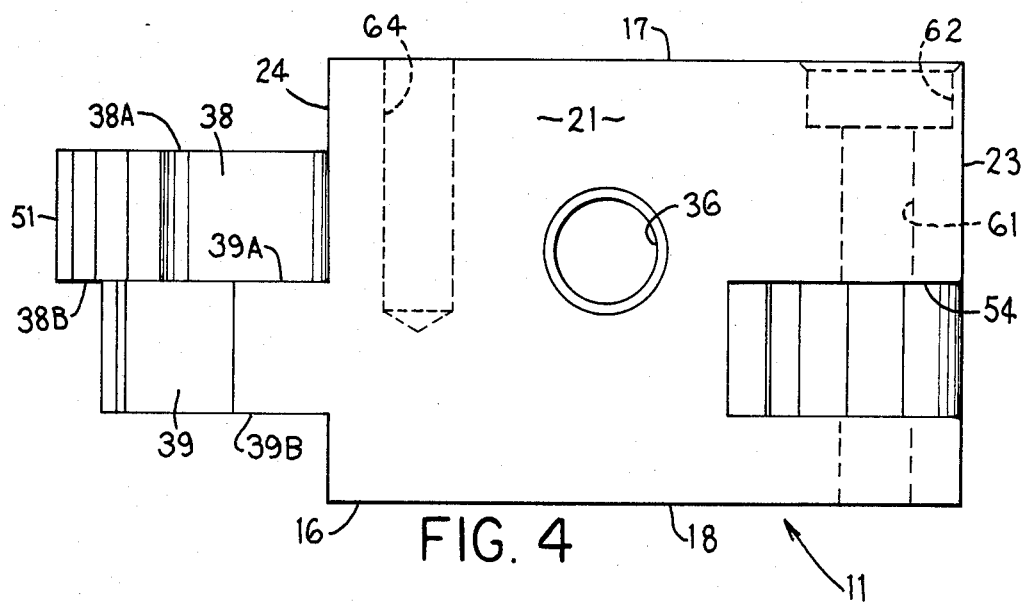
FIGS. 4 and 5 are respective views of opposite sides of the module of FIG. 3.

Certain terminology will be used in the following description for convenience in reference only and will not be limiting. The words "left", "right", "up" and "down" will designate directions in the drawings to which reference is made. The words "in" and "out" will respectively refer to directions toward and away from the geometric center of the device and designated parts thereof. Such terminology will include the words specifically mentioned, derivatives thereof and words of similar import.

DETAILED DESCRIPTION

Referring to FIG. 1, there is illustrated a pneumatic control system which includes a manifold 10 and a plurality of valve assemblies 12 mounted thereon. The manifold 10 of this invention is defined by a plurality of identical and releasably interconnected manifold modules 11. The valve assemblies 12 are not a part of the present invention and are therefore discussed only briefly.

Each of the valves 12 may be any of several conventional and commercially available pneumatic, electrically operated valves, commonly referred to as solenoid valves. Each of the valves 12 is preferably a three-way valve having an exhaust port 13 and not illustrated supply and load ports which communicate with respective passageways provided in the manifold modules 11. When the solenoid is not energized, the valve provides communication between the load port and either the exhaust port or the supply port, and when the solenoid is energized, the valve provides fluid communication between the load port and the other of the exhaust and supply ports.

Regarding the valve assembly 12, one such assembly is illustrated in copending application Ser. No. 380,574, filed concurrently herewith, the disclosure of which is incorporated herein by reference.

Each of the valves 12 is removably mounted on a respective one of the modules 11 by two long screws 67 and 68 which extend completely through the valve in opposite corners thereof and threadably engage openings provided in the module 11 in a manner described in greater detail hereinafter. A gasket 14 is preferably provided between each valve 12 and the associated module 11 to effect a fluid-type seal therebetween, and openings are provided therethrough in alignment with the supply and load ports in the valve 12.

Referring to FIGS. 3 and 4, each of the modules 11 includes a body 16 of substantially rectangular shape having parallel top and bottom surfaces 17 and 18, parallel side surfaces 21 and 22, and parallel end surfaces 23 and 24. A main fluid supply channel 26 of generally circular cross section extends through the body 16 perpendicularly between the end surfaces 23 and 24. The channel 26 has a cylindrical center portion 27 of relatively small diameter, a cylindrical intermediate portion 28 provided at each end of and having a diameter slightly greater than that of the center portion 27, and threaded supply ports 29 at each end thereof which are of somewhat greater diameter than the cylindrical portions 28. The center portion 27 and intermediate portions 28 are connected by respective frusto-conical surfaces 28B and the respective intermediate portions 28 and threaded ports 29 are connected by respective frusto-conical surfaces 28A. The frusto-conical surfaces 28A and 28B converge inwardly toward the central portion 27 of the channel 26.

A main supply opening 30 is provided in the top surface 17 and communicates through a cylindrical vertical passageway with the center portion 27 of the main fluid supply channel 26. A main load port 31 is provided in the side surface 22 and is threaded adjacent its outer end. A vertical load opening 32 is provided in the top surface 17 at a location near the main supply hole 30 and is connected by a vertical passageway to the inner end of the load port 31.

An auxiliary load port 33 is provided in the side surface 22 and is threaded adjacent its outer end. An auxiliary vertical load opening 34 is provided in the bottom surface 18 (FIGS. 3 and 5) and is connected by a vertical passageway to the inner end of the auxiliary load port 33.

An auxiliary fluid supply port 36 (FIGS. 3 and 4) is provided in the side wall 21 and is threaded adjacent its outer end. The auxiliary supply port 36 is a blind opening, its inner end being adjacent but free of fluid communication with the center portion 27 of the main fluid supply channel 26. A vertical auxiliary supply opening 37 is provided substantially in the center of the bottom wall 18. The auxiliary supply opening 37 is a blind opening, its inner end being adjacent but free of fluid communication with the center portion 27 of the fluid supply channel 26.

As shown in FIGS. 3 and 4, the module 11 includes a pair of resilient arms 38 and 39 which are integral with the body 16 and project outwardly from the end surface 24 in a direction generally parallel to the axis of the main fluid supply channel 26. The arm 38 is slightly longer than and has a slightly smaller vertical height than the arm 39 for reasons described in greater detail hereinafter.

Figure 6:
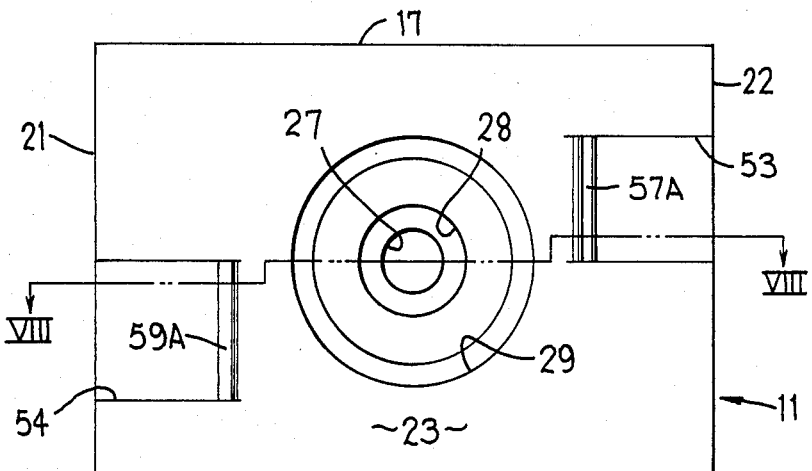
FIGS. 6 and 7 are respective views of opposite ends of the module of FIG. 3.
Figure 7:
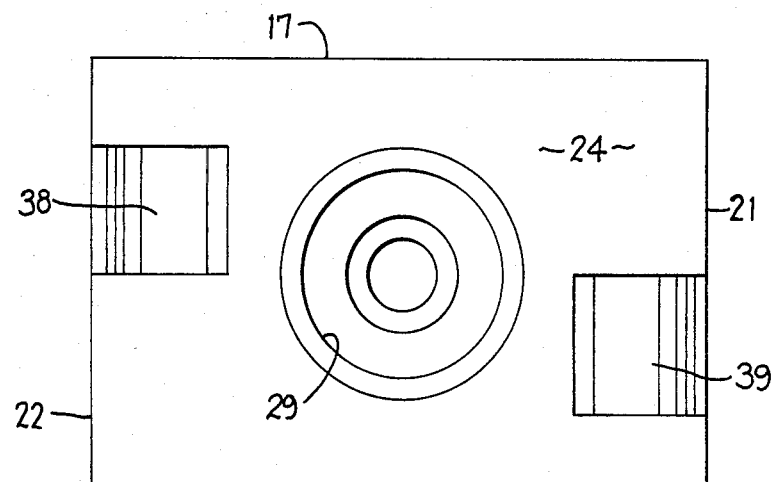

The respective top and bottom surfaces 38A, 38B, 39A and 39B of the arms 38 and 39 are substantially parallel to each other and to the top and bottom surfaces 17 and 18 of the body 16. The arms 38 and 39 are disposed on diametrically opposite sides of the adjacent supply port 29, as shown in FIG. 6, and are offset vertically with respect to each other, the surfaces 38B and 39A lying substantially in a common horizontal plane which includes the axis of the main fluid supply channel 26.

Arm 38 has an outer surface portion 41 thereon which is adjacent the body 16 and substantially coplanar with the side surface 22 thereof, and has an outer surface 42 adjacent the outer end thereof which is inclined inwardly at a small angle 40 with respect to the outer surface 41. The inner surface 46 of the arm 38 has a transversely extending recess or groove 43 at a location spaced from the free end of the arm and from the body 16. The inner surface 46 has a transversely extending notch 47 therein adjacent the outer end of the arm 38. The end surface 51 of the arm 38 is substantially perpendicular to the inner surface 46 and a cam surface 48 is provided therebetween and forms an angle of approximately 45° with respect to each. A bevel surface 50 is provided between the end surface 51 and the outer surface 42, and has a transversely extending notch 49 therein.

The arm 39 is similar in shape to the arm 38 and is therefore not described in detail.

Figure 8:
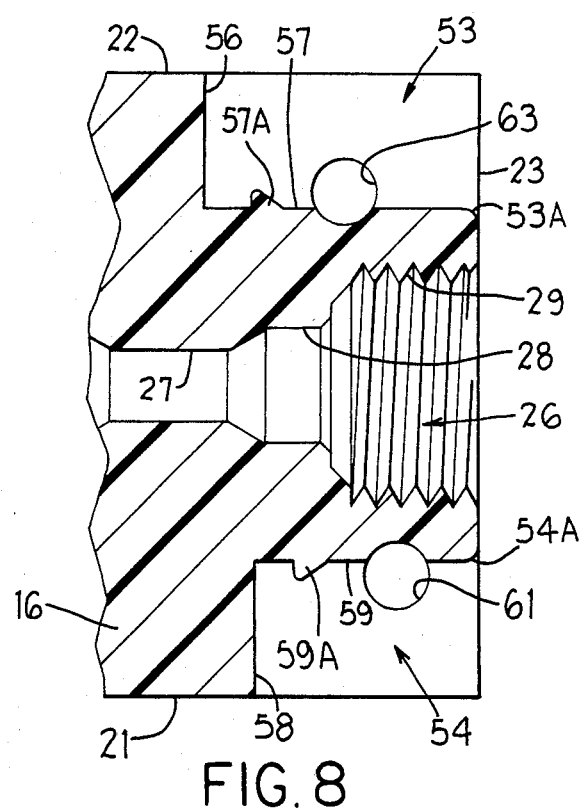
FIG. 8 is a fragmentary sectional view taken along the line VIII—VIII of FIG. 6.
Figure 10:
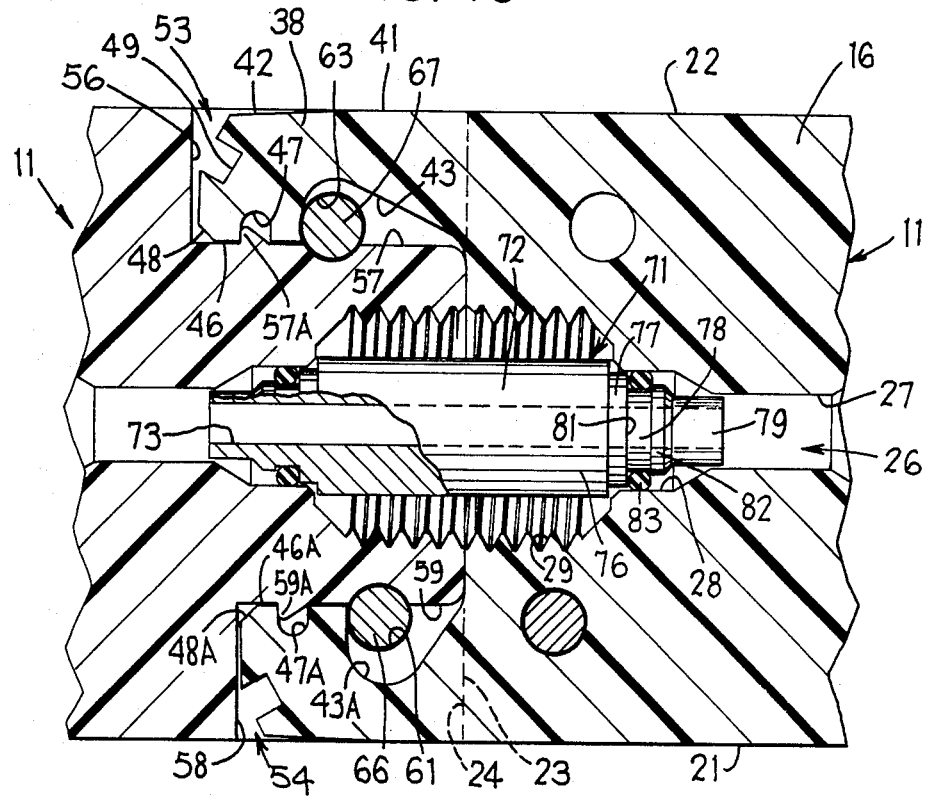
FIG. 10 is a fragmentary sectional top view taken along the line X—X of FIG. 2.
Figure 9:
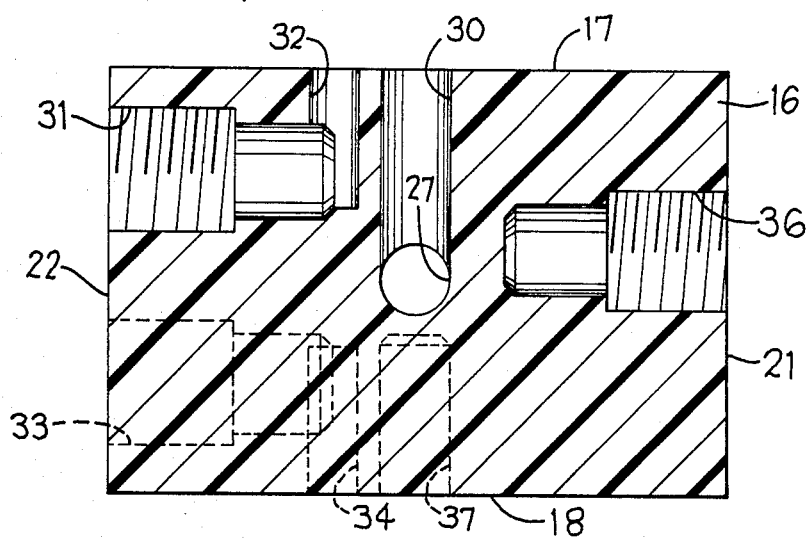
FIG. 9 is a sectional view taken along the line IX—IX of FIG. 3.

A recess 53 (FIGS. 5 and 6) of substantially rectangular shape is provided in the end surface 23 and side surface 22, and a similar recess 54 (FIGS. 4 and 6) is provided in the end surface 23 and the side surface 21. The top and bottom walls of the recesses 53 and 54 are substantially parallel, the distance therebetween being substantially equal to the distance between the top and bottom surfaces of the arms 38 and 39, respectively. As shown in FIGS. 8 and 10, the recesses 53 and 54 have respective vertical end walls 56 and 58 which are substantially parallel to the end surface 23 of the body 16, and have respective vertical side walls 57 and 59 which are substantially perpendicular to the end walls 56 and 58. Each of the side walls 57 and 59 has a respective detent 57A and 59A thereon, which in the illustrated embodiment is a vertically extending ridge having a surface substantially perpendicular to the associated side wall and facing the associated end wall and having a surface on the opposite side which is inclined with respect to the associated side wall.

As shown in FIG. 10, the recesses 53 and 54 have different lengths which are slightly greater than the lengths of the arms 38 and 39, respectively. The distance between the side walls 57 and 59 of the recesses 53 and 54 is substantially equal to the distance between the inwardly facing surfaces 46 and 46A at the ends of the arms 38 and 39. As shown in FIG. 8, beveled surfaces 53A and 54A are provided at the intersections of the respective side walls 57 and 59 and the end surface 23.

As shown in FIGS. 3 and 4, a vertcal opening 61 extends entirely through the body 16 from the top surface 17 to the bottom surface 18 thereof in the region of the intersection of side surface 21 and end surface 23. A counter-bored recess 62 which is coaxial with the opening 61 is provided in the top surface 17 for a purpose described in greater detail hereinafter.

Figure 5:
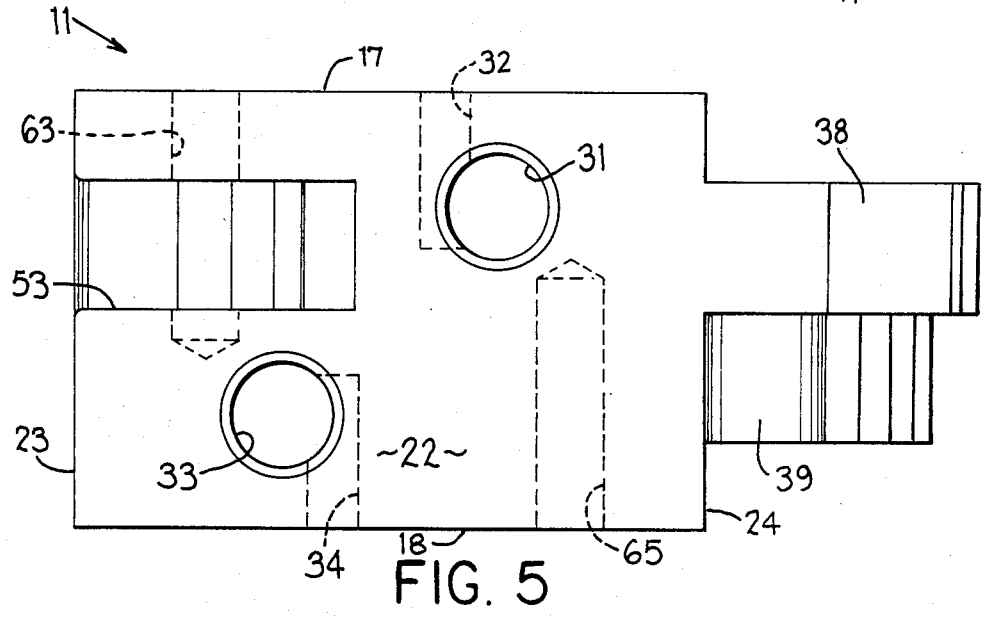

As shown in FIGS. 3 through 5, vertical openings 63 and 64 are provided in the top surface 17 in opposite corners thereof and extend downwardly slightly more than half the distance to the bottom surface 18. The opening 63 is located in the region of the intersection of end surface 23 and side surface 22, and the opening 64 is located in the region of the intersection of end surface 24 and side surface 21. A vertical opening 65 is provided in the bottom surface 18 in the region of the intersection of the end surface 24 and the side surface 22, and extends upwardly slightly more than half the distance to the top surface 17. The openings 64 and 65 are blind openings.

As shown in FIGS. 8 and 10, the opening 63 communicates with the recess 53 and is positioned so as to be aligned with the recess 43 in the inwardly facing surface 46 of the arm 38 of an adjacent interconnected module 11. The opening 61 communicates with the recess 54 and is positioned so as to be aligned with the recess 43A in the arm 39 of the adjacent module 11. A screw 66 (FIG. 10) can be screwed into the opening 61, the head of the screw 66 being received within the counter-bored recess 62 so that it does not project above the plane of the top surface 17. The screws 67 and 68 (FIGS. 1, 2 and 10) which secure the valve assembly 12 on the module 11 are respectively received in the openings 63 and 64.

Referring to FIG. 10, a seal assembly 71 is provided in the adjacent supply ports 29 of two releasably interconnected modules 11 to provide fluid communication between the respective fluid supply channels 26 thereof while preventing leakage of the fluid from the channels 26. The seal assembly 71 includes an elongate connector tube 72 of generally circular cross section having a coaxial central opening 73 therethrough. The tube 72 has a center portion 76 with a diameter slightly greater than that of the cylindrical surfaces 28 in the channels 26. At each end of the center portion 76 is an intermediate portion 77 having a diameter slightly less than that of the surfaces 28. Adjacent each intermediate portion 77 is a seal seat portion 78 which is of slightly lesser diameter than the intermediate portion 77, thereby defining an axially outwardly facing annular shoulder 81 which is axially aligned with the surface 28. Each end 79 of the tube 72 is of slightly lesser diameter than and extends a short distance into the center portion 27 of the channel 26.

The seal seat portion 78 has a radially outwardly projecting annular rim 82 spaced axially outwardly a small distance from the associated shoulder 81, and an elastomeric O-ring 83 encircles the seal seat portion 78 for sealingly engaging the cylindrical surface 28.

In certain applications, as discussed hereinafter, a modified form of the seal assembly 71 is used, which modified seal assembly differs from the seal assembly 71 only in that no central opening 73 is provided therethrough. This modified seal assembly thus effects a sealed separation of the fluid supply channels 26 in adjacent modules 11.

Each of the manifold modules 11 is, in the preferred embodiment, an integral unit made from a relatively hard plastic and is preferably made by a single injection molding operation.

OPERATION

The manifold 10 is assembled by interconnecting two or more of the modules 11 in the following manner. A connector tube 72 having the O-rings 83 already provided thereon is inserted into the supply port 29 of one of the modules 11, for example the port 29 in the end surface 23 of that module. The conical surface 28B cooperates with the end 79 of the connector tube 72 as it is axially inserted to guide it properly into the position illustrated in FIG. 10. The arms 38 and 39 of a second module 11 are then aligned with and slidingly inserted into the respective recesses 53 and 54 of the first module 11 until the two modules snap together in the position illustrated in FIG. 10. The different lengths and vertical heights of the arms 38 and 39 and the corresponding dimensions of the respective recesses 53 and 54 ensure that releasable interconnection of the two modules 11 can be effected only when the modules are properly oriented with respect to each other.

As the arms 38 and 39 are inserted into the recesses 53 and 54, the cam surfaces 48 and 48A on the arms 38 and 39 cooperate with the bevel surfaces 53A and 54A and guide the arms 38 and 39 into the recesses. Since the inwardly facing surfaces 46 and 46A on the arms 38 and 39 are substantially the same distance apart as the side walls 57 and 59 of the recesses 53 and 54, the inwardly facing surfaces 46 and 46A will be disposed against the side walls 57 and 59 of the recesses. The cam surfaces 48 and 48A then cooperate with the inclined surfaces on the detents 57A and 59A to flex the arms 38 and 39 outwardly as they pass the detents 57A and 59A. When the notches 47 and 47A in the arms 38 and 39 are aligned with the detents 57A and 59A, the resilience of the arms urges the ends of the arms inwardly to the position illustrated in FIG. 10, so that the detents 57A and 59A are received in and cooperate with the notches 47 and 47A so as to resist disconnection of the two modules 11. Simultaneously, the conical surface 28B in the second module 11 cooperates with the associated end 79 of the connector tube 72 to guide it properly into the position illustrated in FIG. 10.

A screw 66 is then screwed into the opening 61 in the left module 11 in FIG. 10, the head of the screw 66 being received within the counter-bored recess 62. A gasket 14 is placed on the top surface of the left hand module 11 and a valve assembly 12 is mounted on the left module 11 with the screws 67 and 68, which are respectively screwed into the openings 63 and 64. The not illustrated supply port in the valve 12 is now aligned with the supply opening 30 in the top surface of the module 11 and the not illustrated load port in the valve is aligned with the load opening 32 in the top surface of the module 11, the gasket 14 having openings at corresponding locations therein. As shown in FIG. 10, the screws 67 and 66 respectively extend through the recesses 53 and 54 and are received in the recesses 43 and 43A of the arms 38 and 39. The screws 67 and 66 respectively cooperate with the surfaces of the notches 43 and 43A to snugly lock the two modules 11 in the interconnected relationship.

The resilient bending of the arms 38 and 39 occurs substantially at the narrowest portion thereof. With respect to the arm 38, this is in the region of the intersection of the two outer surfaces 41 and 42 thereof. When the screws 66 and 67 have been screwed into the respective openings 61 and 63, they may tend to flex the ends of the arms 38 and 39 slightly outwardly. When this occurs, the outer surface 42 will move to a position in which it is approximately coplanar with the surface 41 and thus with the side surfaces 22 of the two modules, but the ends of the arms 38 and 39 will still not project outwardly beyond the plane of the side surfaces 22 of the modules 11.

Further modules 11 can be interconnected with these two modules in a similar manner to create a manifold 10 having any desired length. Once the manifold 10 is fully assembled, the port 29 at one end of the manifold 10 is blocked in a conventional manner and fluid pressure from a conventional and not illustrated source is supplied to the manifold 10 through the port 29 at the opposite end thereof. The fluid flows from module to module through the main supply channels 26 and the connector tubes 72, and is thus supplied to each of the valve assemblies 12 through the main supply opening 30 in each of the modules 11. Referring to FIG. 10, the fluid supply pressure in the fluid supply channels 26 urges the O-rings 83 of each seal assembly 71 axially against the adjacent annular shoulder 81, thus deforming the O-ring slightly so that it presses firmly against the surfaces 28, 78 and 81, thereby effecting a tight fluid seal. If the fluid pressure is increased, the deformation of the O-ring is also increased, pressing it more firmly against these surfaces so that a larger surface area of the O-ring is pressed against each surface and the sealing effect is further improved.

An appropriate and conventional load (i.e. an air cylinder) can be connected to the supply port 31 of each module 11. When the associated valve assembly 12 is in one state, the load will be connected through port 31, opening 32 and valve assembly 12 to the exhaust 13. When the valve assembly 12 is in its other state, the load will be connected through port 31, opening 32, valve assembly 12 and opening 30 to the pressurized fluid in the supply channel 26.

If desired, a seal assembly 71 having no central opening 73 therethrough can be provided between two of the modules 11, thereby effecting a sealed separation of the fluid supply channels 26 in the adjacent modules 11. Different fluid pressures can then be supplied to the ports 29 at opposite ends of the manifold 10. Alternatively, the material between the inner end of an auxiliary fluid supply port 36 and the fluid supply channel 26 can be drilled out in one of the modules 11, and fluid pressure can be supplied through the port 36 to the fluid supply channel 26 from a conventional not illustrated source.

In addition to the valve assembly 12 mounted on the top surface 17, a similar and not illustrated valve assembly can be mounted to the bottom surface 18 of any module 11 using a gasket identical to the gasket 14. The mounting screws for such valve assembly extend into the openings 61 and 65. In such case, no screw 66 would be screwed into the hole 61 during mounting of the valve assembly 12 on the top surface 17, since a mounting screw for the valve assembly 12 on the bottom surface 18 would extend into the recess 54 and cooperate with the arm 39 to prevent disconnection of the modules. Prior to mounting this second valve 12, the material between the inner end of the opening 37 and the channel 26 must be drilled out. The second valve would receive air from the main fluid supply channel 26 through the auxiliary supply opening 37 and would control a not-illustrated load through the auxiliary load opening 34 and the auxiliary load port 33.

If desired, a valve assembly can be mounted on the bottom surface 18 of a module 11 without mounting a valve assembly on the top surface 17 thereof. In this case, the main supply opening 30 in the top surface 17 of the module 11 must be plugged or otherwise obstructed in any conventional manner and an extra screw would be screwed into the opening 63 to cooperate with the arm 38 and retain it in the recess 53.

If the manifold 10 is to be disassembled, then all of the screws are removed, including screws 66, 67 and 68, thereby removing the valve assemblies 12 and gaskets 14. The tip of a conventional flat blade screw driver is then inserted into the notch 49 (FIG. 10) on the arm 38 and is used to bend the end of the arm 38 outwardly a small amount to disengage the notch 47 from the detent 57A on the other module 11 and allow the arm 38 in FIG. 10 to move a small distance to the right relative to the left module 11. The screw driver is then used to release the arm 39 in a similar manner, after which the two modules can be separated and the seal assembly 71 removed.

It will be recognized that, in addition to the fluid supply channel 26, an exhaust channel could be provided through each module 11 which communicates through an appropriate passageway with the top surface 17. The valve assembly mounted on the module would then be of a type having its exhaust port adjacent its supply and load ports.

Moreover, the valve assemblies 12 utilized with the modules need not necessarily be three-way valves and could, for example, be conventional four-way valves.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A fluid manifold comprising at least two modules, each said module having first, second and third surfaces thereon, said first and second surfaces being on opposite ends thereof, a fluid supply channel extending therethrough and terminating in first and second fluid supply ports respectively provided in said first and second surfaces, and a first fluid supply opening provided in said third surface and communicating with said supply channel at a location between said first and second supply ports, means integral with said modules for releasably interconnecting said modules in an end-to-end relationship in which said first and second surfaces on respective and adjacent said modules are adjacent and said first and second supply ports therein are substantially aligned, and seal means cooperable with adjacent said modules for preventing leakage of fluid from said fluid supply channels therein; wherein said interconnecting means includes first and second recesses provided in each said module in said second end surface thereof on opposite sides of said second supply port, first and second spaced and resiliently flexible arms on each said module which project outwardly beyond said first end surface thereof on substantially opposite sides of said first supply port and substantially parallel to said supply channel therein, said first and second arms respectively being received in said first and second recesses when said modules are in said end-to-end relationship, first detent means provided on each said arm adjacent an outer end thereof, and second detent means provided in each said recess and cooperable with said first detent means on a said arm of an adjacent said module when said modules are in said end-to-end relationship for releasably maintaining said modules in such relationship; and wherein said interconnecting means includes a transversely extending groove provided in an inwardly facing surface of each said arm at a location spaced from said outer end thereof, and first and second fastener openings in each said module extending transversely to and respectively communicating with said first and second recesses, each said fastener opening being aligned with a said groove in a respective said arm of another said module when said modules are in said end-to-end relationship, whereby fasteners inserted into said first and second fastener openings of a said module will cooperate with said grooves in said arms of an adjacent said module to maintain said modules in said interconnected end-to-end relationship.

2. The manifold according to claim 1, wherein the height of said first arm is greater than that of said second arm, and wherein the heights of said first and second recesses respectively correspond to the heights of said first and second arms, thereby ensuring that said releasable interconnection of said modules can be effected only when said modules have a predetermined orientation with respect to each other.

3. The manifold according to claim 2, including facing surfaces provided on said arms adjacent the outer ends thereof and extending generally parallel to said fluid supply channel, each said recess having a wall therein which is parallel to and adjacent a respective said facing surface when said modules are in said interconnected relationship, said first detent means being a notch provided in each said facing surface and said second detent means being a projection provided on said wall of each said recess, each said arm having an inclined cam surface at the outer end thereof and adjacent said facing surface thereon for guiding said arm over a said projection as said arms slide into respective said recesses during interconnection of said modules.

4. A fluid manifold comprising at least two identical modules, each said module including: a substantially rectangular body having parallel first and second end surfaces at opposite ends thereof, parallel top and bottom surfaces, and parallel first and second side surfaces; a fluid supply channel extending through said body and terminating in first and second fluid supply ports respectively provided in said first and second end surfaces; a first fluid supply opening provided in said top surface and communicating with said supply channel at a location between said first and second supply ports; a second fluid supply opening provided in said bottom surface, said second supply opening being a blind opening having an inner end adjacent and free of communication with said fluid supply channel; first and second load ports provided in said first side surface and respectively communicating with first and second load openings which are respectively provided in said top and bottom surfaces; an auxiliary fluid supply port provided in said second side surface, said auxiliary fluid supply port being a blind opening having an inner end adjacent and free of communication with said fluid supply channel; means for releasably interconnecting said modules in an end-to-end relationship in which said first and second end surfaces on respective and adjacent said modules are adjacent and said first and second supply ports therein are substantially aligned; seal means cooperable with adjacent said modules for preventing leakage of fluid from said fluid supply channels therein; said interconnecting means including first and second recesses provided in said second end surface of said body of each said module on opposite sides of said second supply port, first and second spaced and resiliently flexible arms provided on said body of each said module integral therewith and projecting outwardly beyond said first end surface thereof on substantially opposite sides of said first supply port, a transversely extending groove provided in an inwardly facing surface of each said arm at a location spaced from the outer end thereof, said first and second arms respectively being received in said first and second recesses of an adjacent module when said modules are interconnected in said end-to-end relationship, and detent means on each said module for releasably maintaining said first and second arms of one said module in said first and second recesses of an adjacent said module so as to releasably hold said modules in said end-to-end relationship; and first and second fastener openings in said body of each said module which respectively communicate with said first and second recesses, each said fastener opening being aligned with a said groove in a respective said arm of another said module when said modules are in said interconnected relationship.

5. The manifold according to claim 4, wherein the inwardly facing surface provided on each said arm extends generally parallel to said fluid supply channel, each said recess having a wall parallel to and adjacent a respective said inwardly facing surface when said modules are in said interconnected relationship, said detent means including a notch in each said inwardly facing surface and a projection on said wall of each said recess, and each said arm having an inclined cam surface at the outer end thereof and adjacent said inwardly facing surface thereon for guiding the arm over the associated projection as said arms slide into respective said recesses during interconnection of said modules.

6. The manifold according to claim 4, wherein said first fastener opening extends through said body of said module from said top surface to said bottom surface; wherein said second fastener opening is provided in said top surface; including a counterbored recess in said top surface concentric with said first fastener opening; and including vertically extending third and fourth fastener openings respectively provided in said top and bottom surfaces of said body adjacent said first and second arms, said second, third and fourth fastener openings each extending into said body a distance less than the distance between said top and bottom surfaces.

7. The manifold according to claim 6, wherein said first arm has a height greater than that of said second arm and said second arm has a length greater than that of said first arm, and said first and second recesses have heights and depths which respectively correspond to the heights and lengths of said first and second arms, whereby said releasable interconnection of said modules can be effected only when said modules have a predetermined orientation with respect to each other;

wherein said first and second recesses respectively open through said second and first side surfaces; and wherein said first and second arms each have a notch at the outer end thereof which is externally accessible when said modules are in said interconnected relationship.

8. The manifold according to claim 7, wherein said first, second and auxiliary fluid supply ports and said first and second load ports are internally threaded.

9. The manifold according to claim 8, wherein said fluid supply channel includes a central portion which communicates with said first fluid supply opening, outwardly diverging first frustoconical portions at each end of said central portion, a cylindrical intermediate portion of larger diameter than said central portion adjacent each said first frustoconical portion, and an outwardly diverging second frustoconical portion between each said intermediate portion and the associated one of said fluid supply ports; and wherein said seal means includes a connector tube which is disposed in said aligned first and second supply ports of adjacent said modules and has ends extending past said cylindrical intermediate portions of said fluid supply channel, said connector tube having means defining an axially outwardly facing annular shoulder near each end thereof which is axially aligned with a respective said intermediate portion of said fluid supply channel, each said shoulder having two cylindrical tube surfaces on opposite sides thereof and the larger of said cylindrical tube surfaces having a diameter slightly less than that of said cylindrical intermediate portion of said fluid supply channel, said seal means further including an elastomeric seal ring closely encircling each said cylindrical tube surface of smaller diameter and disposed against the associated annular shoulder and said intermediate portion of said fluid supply channel, and means for preventing substantial movement of said elastomeric ring away from said axially facing shoulder.

10. The manifold according to claim 9, wherein each said module is an integral one-piece element made of a relatively rigid plastic material.

11. In a fluid valve-manifold arrangement including a manifold having at least first and second identical manifold modules releasably connected together in adjacent end-to-end relationship, and a separate valve unit releasably mounted on each of said first and second manifolds, the improvement comprising:

each of said first and second manifold modules comprising a one-piece plastic body having a main boxlike body portion having first and second substantially parallel end surfaces, substantially parallel top and bottom surfaces and substantially parallel first and second side surfaces;

said body having a main fluid supply channel extending interiorly therethrough between said first and second end surfaces and a first fluid supply opening provided in said top surface and communicating with said fluid supply channel;

said one-piece body including first and second recesses formed therein on opposite sides of said main supply channel, said first and second recesses opening inwardly from said first end surface and being disposed on opposite sides of said main body portion so as to open outwardly through the respective first and second side surfaces, said first and second recesses being of different configurations;

said one-piece body also having first and second cantilevered arms integrally fixed thereto and projecting outwardly beyond said second end surface, said first and second arms being disposed on opposite sides of said main supply channel and substantially flush with the respective first and second side surfaces, said first and second arms being of different configurations, said first and second arms having configurations which are respectively compatible with said first and second recesses so that the first and second arms will respectively positionally fit within the respective first and second recesses of an adjacent said module when two said modules are connected in adjacent end-to-end relationship, said first arm being positionable within the respective first recess but not within the second recess to ensure proper orientation between the adjacent modules;

detent means formed integrally on each said module and coacting between each said arm and its respective said recess to create a resilient snaplike engagement of each said arm on one said module with the respective said recess on an adjacent said module; and a plurality of elongate fasteners extending between one said valve unit and a respective said module for removably securing said valve unit adjacent the top surface of the respective said module, at least one of said elongate fasteners projecting downwardly of the respective module into one of said recesses for creating a locking engagement with the arm of the adjacent module as disposed within said recess for preventing separation of said adjacent modules.

12. An arrangement according to claim 11, wherein said first arm has a height and length which are respectively greater than and less than the respective height and length of the second arm so that the first and second arms are respectively engageable solely within the respective first and second recesses, and not vice versa, wherein each said arm has a groove formed therein and extending transversely thereacross at a location spaced inwardly from the free end of the respective arm, wherein said one-piece body has first and second fastener openings projecting inwardly from the top surface thereof and downwardly for communication with the respective first and second recesses, the grooves formed in said first and second arms being substantially aligned with the respective first and second fastener openings when the arms are disposed within the respective recesses, said one elongate fastener being positioned within one of said fastener openings, and a further elongate fastener being disposed within the other of said fastener openings, each of said latter elongate fasteners projecting through the groove of the respective arm and across the respective recess for fixedly securing the adjacent modules together.

* * * * *